United States Patent
Trombke et al.

(10) Patent No.: US 9,644,415 B2
(45) Date of Patent: May 9, 2017

(54) METHOD FOR CONTROLLING A MOTOR-POWERED HATCH ARRANGEMENT OF A MOTOR VEHICLE

(75) Inventors: Sebastian Trombke, Coburg (DE); Heiko Loehnert, Grosswalbur (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 0 days.

(21) Appl. No.: 13/458,607

(22) Filed: Apr. 27, 2012

(65) Prior Publication Data
US 2012/0277958 A1 Nov. 1, 2012

(30) Foreign Application Priority Data

Apr. 27, 2011 (DE) .................. 10 2011 018 849

(51) Int. Cl.
*B60R 22/00* (2006.01)
*E05F 15/00* (2015.01)
(Continued)

(52) U.S. Cl.
CPC ........ *E05F 15/70* (2015.01); *B60G 2400/952* (2013.01); *B60G 2800/204* (2013.01); *E05Y 2400/32* (2013.01); *E05Y 2900/546* (2013.01)

(58) Field of Classification Search
CPC  B60G 21/06; B60G 17/017; B60G 2400/952; B60G 2800/204; B60J 5/10;
(Continued)

(56) References Cited

U.S. PATENT DOCUMENTS 6,202,010 B1 * 3/2001 Shono .................. B60G 17/017
180/41
6,755,458 B1 6/2004 Oberheide et al.
(Continued)

FOREIGN PATENT DOCUMENTS

CN  2725474    9/2005
CN  101379262  3/2009
(Continued)

OTHER PUBLICATIONS

"Chinese Search Report," for corresponding Chinese Patent Application No. 201210222935.5, mailed Apr. 27, 2015 (3 pages).
(Continued)

*Primary Examiner* — Isaac Smith
(74) *Attorney, Agent, or Firm* — Pauly, Devries, Smith & Deffner, LLC

(57) ABSTRACT

Described herein is a method for controlling a motor-powered hatch arrangement of a motor vehicle, wherein the hatch arrangement has an upwardly deflectable hatch, in particular an upwardly pivotable hatch, a drive arrangement which is assigned to the hatch and a control arrangement which is assigned to the drive arrangement, wherein the motor-powered deflection of the hatch in the opening direction is limited to a maximum hatch deflection by means of a control arrangement. It is proposed that the chassis of the motor vehicle can be adjusted vertically as required in order to set different vehicle body levels, and in that the maximum hatch deflection is adapted to a change in the vehicle body level by means of the control arrangement.

18 Claims, 2 Drawing Sheets

(51) Int. Cl.
*G05D 1/00* (2006.01)
*E05F 15/70* (2015.01)

(58) Field of Classification Search
CPC .. H02P 1/04; E05F 15/63; E05F 15/70; E05Y 2900/546; E05Y 2400/32
USPC ............ 701/48, 49; 49/340, 358; 296/146.4, 296/146.8; 71/48, 49
See application file for complete search history.

(56) References Cited

U.S. PATENT DOCUMENTS

| | | | |
|---|---|---|---|
| 6,814,392 B1* | 11/2004 | Tomaszewski ....... | E05F 15/622 296/146.4 |
| 7,083,217 B2 | 8/2006 | Fukumoto et al. | |
| 8,234,817 B2 | 8/2012 | Klippert et al. | |
| 2003/0146644 A1* | 8/2003 | Sakai .................... | E05F 15/619 296/146.8 |
| 2005/0017539 A1* | 1/2005 | Ihashi et al. ............... | 296/146.8 |
| 2005/0168010 A1* | 8/2005 | Cleland ................. | E05F 1/1091 296/146.8 |
| 2006/0066278 A1* | 3/2006 | Kuan ..................... | E05F 15/63 318/466 |
| 2012/0151840 A1* | 6/2012 | Scheler .......................... | 49/358 |

FOREIGN PATENT DOCUMENTS

| | | |
|---|---|---|
| CN | 101767607 | 7/2010 |
| DE | 3826843 | 1/1992 |
| DE | 10225887 | 1/2004 |
| DE | 10323077 | 12/2004 |
| DE | 102008042183 | 3/2010 |
| JP | 2008037395 | 2/2008 |

OTHER PUBLICATIONS

"Search Report," for German Patent Application No. 102011018849.5, with machine translation from www.translate.google.com, related to U.S. Appl. No. 13/458,607, mailed Jan. 12, 2012 (5 pages).

* cited by examiner

METHOD FOR CONTROLLING A MOTOR-POWERED HATCH ARRANGEMENT OF A MOTOR VEHICLE

CROSS-REFERENCE TO RELATED APPLICATIONS

This application claims the benefit of German Patent Application No. DE 10 2011 018 849.5, filed Apr. 27, 2011, the disclosure of which is incorporated by reference herein in its entirety.

FIELD OF THE INVENTION

The invention relates to a method for controlling a motor-powered hatch arrangement of a motor vehicle and to a motor-powered hatch arrangement of a motor vehicle.

BACKGROUND OF THE INVENTION

The comfort function of motor-powered adjustment of a hatch of a motor vehicle has become increasingly established in the market in the last few years. This comfort function can basically be applied to all types of hatches. Accordingly, the term "hatch" is to be understood here in a comprehensive fashion. This term includes tailgates, rear lids, engine bonnets, doors, side doors, luggage floors or the like of a motor vehicle in so far as substantially upward adjustment of said components can be carried out.

A known tailgate arrangement (DE 102 25 887 A1) is equipped with an upwardly pivotable tailgate and with a drive arrangement which is assigned to the hatch, and a control arrangement which is assigned to the drive arrangement. In order to increase the comfort of use, the known hatch arrangement is controlled in such a way that the maximum hatch deflection can be set in a user-defined fashion.

The user-defined setting of the maximum hatch deflection is advantageous, for example, if the motor vehicle is always parked in the same garage or the like with a reduced ceiling height. When the maximum hatch deflection is learnt, hatch height can be limited to a maximum height with the result that collision of the tailgate with the ceiling region of the garage or the like is avoided.

Another advantage of the user-defined setting of the maximum hatch deflection becomes apparent, for example, in the case of tailgates of mini vans. In many cases, in the fully open state these tailgates cannot be reached by the user. This leads to a loss of comfort in particular in the cases in which the tailgate has an operator control on the side which points downward in the open state, with which operator control the motor-powered closing of the tailgate can be initiated. With the user-defined setting of the maximum hatch deflection it can be ensured that the operator control can always be reached by the respective user.

The setting of a static maximum hatch deflection referred to above gives rise to the above-mentioned advantages if the motor vehicle body is always kept at the same level. However, this is not the case if the motor vehicle is equipped with a vertically adjustable chassis which serves to set different vehicle body levels. Here, the vertical adjustment of the chassis is, for all intents and purposes, superimposed on the set static maximum hatch deflection. This can lead to a situation in which when the chassis is raised the hatch can no longer be reached, which is to be considered a loss of comfort. In the most unfavourable case, collisions may even occur with the ceiling area of a garage or the like, specifically if the hatch is adjusted to a previously set static maximum hatch deflection when the chassis has been inadvertently raised. This entails a reduction in the operational safety.

SUMMARY OF THE INVENTION

The invention is based on the problem of configuring and developing the known method in such a way that the comfort of use and the operational safety during the motor-powered adjustment of the hatch in motor vehicles with a vertically adjustable chassis are increased.

The above problem is solved with a method for controlling a motor-powered hatch arrangement of a motor vehicle, wherein the hatch arrangement has an upwardly deflectable hatch, in particular an upwardly pivotable hatch, a drive arrangement which is assigned to the hatch and a control arrangement which is assigned to the drive arrangement, wherein the motor-powered deflection of the hatch in the opening direction is limited to a maximum hatch deflection by means of a control arrangement. In one embodiment, the chassis of the motor vehicle can be adjusted vertically as required in order to set different vehicle body levels, and the maximum hatch deflection is adapted to a change in the vehicle body level by means of the control arrangement.

What is essential is the basic idea of adapting the maximum hatch deflection to a change in the vehicle body level by means of the control arrangement.

An advantage of the solution according to the proposal is initially apparent with respect to the reduction in the risk of collisions, for example with the ceiling area of a garage. A maximum hatch deflection which has been previously set for the purpose of avoiding collisions can advantageously be adapted to a change in the vehicle body level in such a way that collisions continue to be avoided even when there is a change in the vehicle body level.

A further advantage is apparent in the unrestricted operating capability of the hatch arrangement. A maximum hatch deflection, which is set in order that an operator control on the hatch can be reached, can be adapted according to the proposal in such a way that it is ensured that said operator control can be reached even when there is a change in the vehicle body level.

With the solution according to the proposal it is therefore possible not only to increase the operational reliability but also to improve the comfort of use independently of a change in the vehicle body level.

The term "adaptation" is to be interpreted widely here. It is meant here that a change in the vehicle body level can entail some kind of change in the maximum hatch deflection. However it is also conceivable here that when there are certain changes in the vehicle body level there is no change in the maximum hatch deflection.

In one embodiment, the hatch is configured so as to be pivotable about a substantially horizontal hatch axis, and the maximum hatch deflection corresponds to a pivoting angle of the hatch about the hatch axis.

In another embodiment, in the control arrangement, the hatch deflection is represented by a drive variable, in particular, percentage adjustment travel of the drive arrangement.

In one embodiment, a maximum hatch deflection is set, in particular in a user-defined fashion, in particular learnt, by means of the control arrangement in a setting process and stored, preferably in that the corresponding hatch height is determined from the set maximum hatch deflection by means of the control arrangement using the hatch geometry and is stored as a maximum hatch height.

In another embodiment, a maximum hatch height is set, in particular in a user-defined fashion, in particular learnt, by means of the control arrangement in a setting process and stored, preferably in that the corresponding hatch deflection is determined from the set maximum hatch height by means of the control arrangement using the hatch geometry, and is stored as a maximum hatch deflection.

In another embodiment, the vehicle body level which is present during the setting process is determined by means of the control device and stored as a reference vehicle body level, or in that the setting process is always performed with a predetermined reference vehicle body level.

In another embodiment, the absolute value of the adaptation of the maximum hatch deflection depends linearly on the absolute value of the change in the vehicle body level, in particular on the absolute value of the deviation of the vehicle body level from the reference vehicle body level.

A simple rule for adapting the maximum hatch deflection is adapting the maximum hatch deflection in such a way that when there is an upward or downward change in the vehicle body level there is a resulting counteracting downward or upward change in the maximum hatch deflection. Accordingly, a change in the vehicle body level is compensated for—to a certain degree—by counteracting adaptation of the maximum hatch deflection.

In the further preferred refinements, the adaptation according to the proposal ensures that the hatch height does not unexpectedly increase as a result in the change in the vehicle body level, which, as described above, can give rise to a risk of collision and/or to an adverse effect on the possibility of reaching an operator control. In one embodiment, the maximum hatch deflection is adapted to a change in the vehicle body level, taking into account the hatch geometry, in such a way that at the respective maximum hatch deflection the hatch height before the change does not exceed the hatch height after the change, preferably in that the two hatch heights are substantially identical. In another embodiment, the maximum hatch deflection is adapted to a change in the vehicle body level, taking into account the hatch geometry, in such a way that at the maximum hatch deflection the hatch height does not exceed the stored maximum hatch height after the change in the vehicle body level, preferably such that at the maximum hatch deflection the hatch height is identical to the stored maximum hatch height after the change in the vehicle body level.

According to another embodiment, it is of interest that the hatch height which is referred to above can be defined in completely different ways. In one variant, the hatch height is the height of a reference point on the hatch which is located in the region of an operator control of the hatch. Another advantageous variant for the definition of the hatch height is the height of the respectively highest point of the hatch. The last-mentioned variant is advantageous in particular with respect to the desired avoidance of collisions. In particular, the hatch height is the height of a reference point on the hatch or the height of the highest point of the hatch, preferably in that the reference point is located in the region of an operator control of the hatch.

In another embodiment, when the hatch is at the maximum hatch deflection, in the course of the adjustment of the vehicle body level the current maximum hatch deflection is continuously adapted to the current vehicle body level, and the hatch is adjusted to the respectively adapted maximum hatch deflection.

Another embodiment is directed towards a motor-powered hatch arrangement of a motor vehicle, wherein the hatch arrangement has an upwardly deflectable hatch, in particular an upwardly pivotable hatch, a drive arrangement which is assigned to the hatch and a control arrangement which is assigned to the drive arrangement, wherein the control arrangement limits the motor-powered deflection of the hatch in the opening direction to a maximum hatch deflection, wherein the chassis of the motor vehicle can be adjusted vertically as required in order to set different vehicle body levels, and the control arrangement adapts the maximum hatch deflection to a change in the vehicle body level.

BRIEF DESCRIPTION OF THE FIGURES

The invention will be explained in more detailed below with reference to a drawing which merely illustrates an exemplary embodiment. In the drawing.

DETAILED DESCRIPTION

Figure 1:
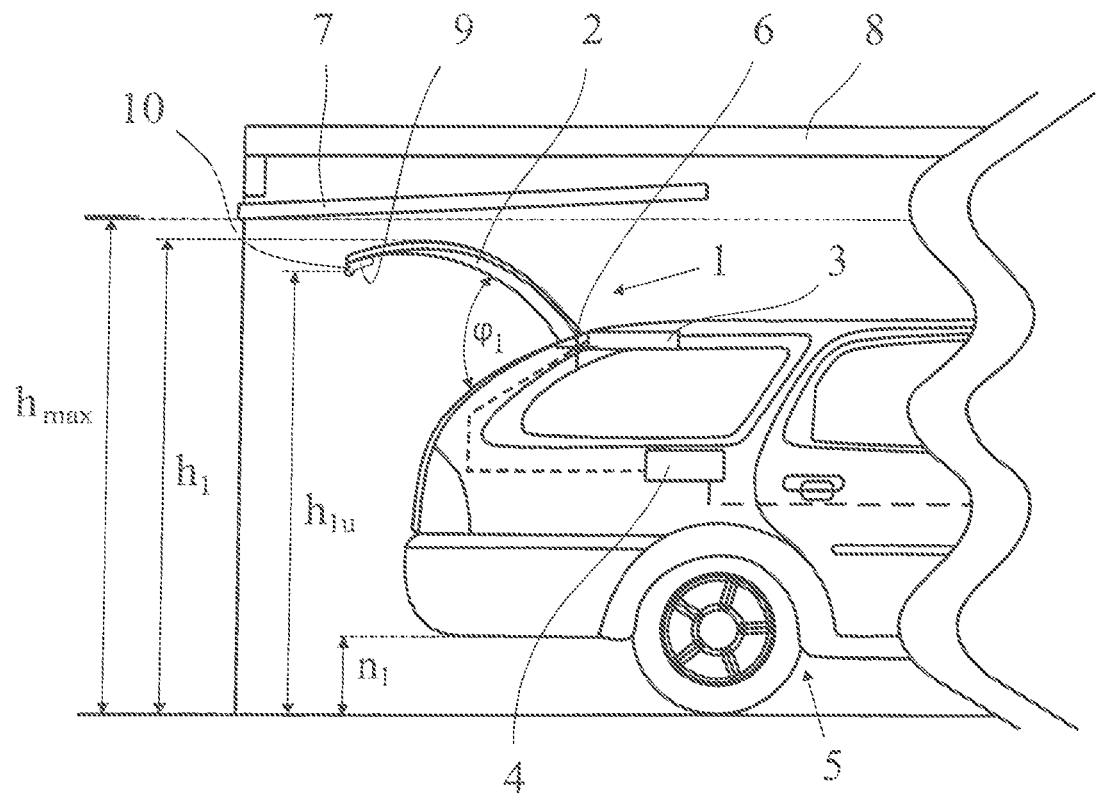
FIG. 1 shows a motor vehicle with a hatch arrangement according to the proposal during the setting process when the tailgate is at a set maximum hatch deflection.

The hatch arrangement 1 illustrated in the drawing is a tailgate arrangement which is correspondingly equipped with a tailgate 2. For further understanding of the term "hatch arrangement", reference can be made to the introductory part of the description. All the following statements relating to a tailgate apply correspondingly equally to all the other types of hatches referred to there.

In the hatch arrangement 1 illustrated, the assigned hatch 2 can be adjusted essentially upward. The term "essentially upward" is to be understood as meaning that at least part of the hatch is adjusted upward in the vehicle direction over at least one movement region. Here, the hatch 2 is preferably configured as a pivotable tailgate, as will be explained later in detail.

The hatch 2 is assigned, in a manner known per se, a drive arrangement 3 and a control arrangement 4 which is assigned to the drive arrangement 3. The control arrangement 4 is generally coupled to a superordinate controller or the like via a BUS system, in particular via a CAN BUS.

Figure 2:
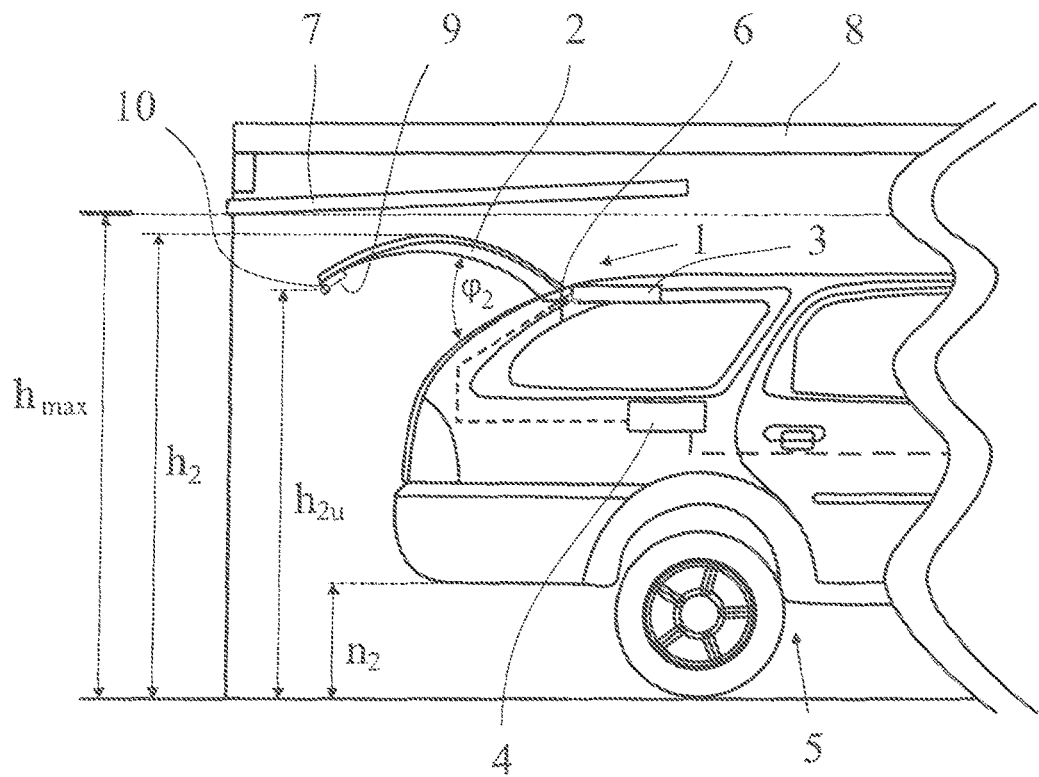
FIG. 2 shows the motor vehicle according to FIG. 1 with a changed vehicle body level and with the tailgate in a maximum hatch deflection which is adapted to the change in the vehicle body level.

FIGS. 1 and 2 each show a situation in which the hatch 2 has been adjusted to a maximum hatch deflection $\phi_1$, $\phi_2$, wherein FIG. 1 relates to a setting process which will be explained below. What is significant here is the fact that the motor-powered adjustment of the hatch 2 in the opening direction is limited in terms of control technology to a maximum hatch deflection $\phi$. Adjustment of the hatch 2 in the opening direction beyond the maximum hatch deflection $\phi$ is therefore blocked in terms of control technology.

By combining FIGS. 1 and 2 it is also possible to infer that the chassis 5 of the illustrated motor vehicle can be adjusted vertically as required in order to set different vehicle body levels $n_1$, $n_2$. FIG. 2 shows a raised motor vehicle level $n_2$ compared to the motor vehicle level $n_1$ illustrated in FIG. 1.

What is significant is that the maximum hatch deflection $\phi$ is adapted to a change in the vehicle body level n by means of the control arrangement 4. In the case of the illustrated exemplary embodiments, the raising of the vehicle body from the vehicle body level $n_1$ to the vehicle body level $n_2$ gives rise to a corresponding adaptation, here a corresponding reduction, of the maximum hatch deflection $\phi_1$ to the maximum hatch deflection $\phi_2$. The adaptation, according to the proposal, of the maximum hatch deflection $\phi$ will be explained in more detail below.

It has already been pointed out that the solution according to the proposal can be applied to all types of hatch arrangements 1 in which the assigned hatch 2 can be deflected upward. Here, the hatch 2 is preferably configured such that it can be pivoted about a substantially horizontal hatch axis 6, wherein the maximum hatch deflection $\phi$ always corresponds to a pivoting angle $\phi$ of the hatch 2 about the hatch axis 6. It can be pointed out that although the hatch axis 6 is arranged on the motor vehicle body, it is possible to provide that the position of the hatch axis 6 changes slightly relative to the motor vehicle body, in particular that the hatch axis 6 "migrates" during the adjustment of the hatch 2 owing to the kinematic conditions.

Basically it is conceivable that the operation, according to the proposal, of the control arrangement 4 is based on the pivoting angle $\phi$ of the hatch 2. However, in a particularly preferred refinement there is provision that in the control arrangement 4 the hatch deflection is represented by a drive variable, preferably by the, in particular, percentage adjustment travel of the drive arrangement 3. The drive arrangement 3 is preferably equipped with at least one incremental sensor for detecting the adjustment travel of the drive arrangement 3. The hatch deflection $\phi$ is preferably represented by the number of sensor signal increments with respect to a home position of the drive arrangement 3. Basically it is in turn conceivable here that the pivot angle $\phi$ of the hatch 2 is obtained from the drive variable by back calculation by means of the control arrangement 4. Wherever the storage of a hatch deflection $\phi$ is mentioned below, it is possible to understand, depending on the exemplary embodiment, that the actual pivot angle $\phi$ or else the above drive variable is meant.

The above incremental sensor is preferably a Hall sensor to which a permanent magnet arrangement on a movable drive component is assigned. The adjustment of the drive component including the permanent magnet arrangement correspondingly causes the above sensor signal increments to be generated.

In order to be able to perform adaptation of the maximum hatch deflection $\phi$ at all, some kind of reference has to be defined for this adaptation. For this, a setting process is provided which can run in quite different ways. The situation in the setting process is shown in FIG. 1.

In a first preferred variant for a setting process, a maximum hatch deflection $\phi_1$ is set and stored. In this context, the maximum hatch deflection $\phi_1$ which is set can basically be set and stored automatically in particular in a sensor-based fashion.

However, a user-defined setting, in particular the learning of a maximum hatch deflection $\phi_1$, is preferably provided here. In the situation illustrated in FIG. 1, this means that the user adjusts the hatch 2 using, for example, a radio key, in such a way that the hatch 2 is in the desired maximum hatch deflection $\phi_1$. In FIG. 1, the user has adjusted the flap 2 in such a way that on the one hand a collision with the ceiling area 7, here the door 7 of the garage 8, is ruled out and that, on the other hand, it is ensured that the operator control 9 arranged on the hatch 2 can be reached.

In a particularly preferred embodiment, the corresponding hatch height $h_1$ is determined from the maximum hatch deflection $\phi_1$ set in this way, using the known hatch geometry and stored as a maximum hatch height $h_1$. The respective highest point of the hatch 2 is firstly used in this case as the "hatch height". Other definitions are possible here, said definitions giving rise to a different technical control treatment and being explained in more detail below.

The determination of the above maximum hatch height $h_1$ from the maximum hatch deflection $\phi_1$ can take place on the basis of a geometric hatch model. However, it is also conceivable for concordance tables, permitting correspondingly approximate determination of the maximum hatch height $h_1$, also to be stored in the control arrangement 4.

In a second preferred variant of a setting process, the maximum hatch height $h_1$ is set and stored in a setting process by means of the control arrangement 4 in the situation illustrated in FIG. 1. What is significant here is that the maximum hatch height $h_1$ which is set is selected to be below the ceiling height $h_{max}$. The corresponding hatch deflection $\phi_1$ is then determined from the set maximum hatch height $h_1$ using the hatch geometry, and is stored as a maximum hatch deflection $\phi_1$. The setting process can also be carried out in a sensor-based fashion here or else also in a user-defined fashion.

Different variants are conceivable for the user-defined setting of the maximum hatch deflection $\phi_1$ and/or of the maximum hatch height $h_1$. In one variant, the values which are to be set are input by means of a keyboard or the like at an operator terminal. Another variant, preferred here, is that the respective values are learnt by a corresponding adjustment of the hatch 2, as has been indicated above.

In a particularly preferred refinement, not only are the maximum hatch deflection $\phi_1$ and/or the maximum hatch height $h_1$ stored during the setting process but also the vehicle body level $n_1$ which is present during the setting process is determined and stored as a reference vehicle body level. At any rate, the storage can be dispensed with if the setting process is always performed at a predetermined reference vehicle body level. The setting process could then, for example, be blocked if the motor vehicle level n is not completely lowered.

The stored values for the maximum hatch deflection $\phi$, the maximum hatch height h and the reference vehicle body level n can be used as a basis for the adaptation of the maximum hatch deflection $\phi$, depending on the adaptation algorithm.

In a variant which is particularly easy to implement in terms of control technology, the absolute value of the adaptation of the maximum hatch deflection $\phi$ depends linearly on the absolute value of the change in the vehicle body level n, preferably on the absolute value of the deviation of the vehicle body level n from the reference vehicle body level here.

Generally, the maximum hatch deflection $\phi$ is preferably adapted in such a way that when there is an upward or downward change in the vehicle body level n there is a resulting counteracting downward or upward change in the maximum hatch deflection $\phi$. In this context, the change which is directed upward or downward in the maximum hatch deflection $\phi$ which corresponds here to a pivot angle $\phi$ of the hatch 2 means that the hatch 2 moves overall upward or downward in a first approximation. As a result, a change in the motor vehicle level n is therefore compensated for by a counteracting change in the maximum hatch deflection $\phi$.

In the above sense, a preferred variant provides that the adaptation of the maximum hatch deflection $\phi$ is adapted to a change in the vehicle body level in such a way that at the respective maximum hatch deflection $\phi$ the hatch height $h_1$ before the change does not exceed the hatch height $h_2$ after the change. FIG. 1 shows the hatch height $h_1$ when the hatch 2 is at the set maximum hatch deflection $\phi_1$. After the raising of the motor vehicle body to the vehicle body level $n_2$, the maximum hatch deflection $\phi$ is reduced from the pivot angle $\phi_1$ to the pivot angle $\phi_2$ in such a way that the hatch height $h_2$ which is illustrated in FIG. 2 is even substantially identical to the hatch height $h_1$ illustrated in FIG. 1.

It is also conceivable that the adaptation of the maximum hatch deflection $\phi$ is always adapted to a change in the vehicle body level n with respect to the stored maximum hatch height $h_1$. It is preferably provided here that the maximum hatch deflection $\phi$ is adapted to a change in the vehicle body level n, taking into account the hatch geometry, in such a way that at the maximum hatch deflection $\phi$ the hatch height h does not exceed the stored maximum hatch height $h_1$ after the change in the vehicle body level n. Here, at the maximum hatch deflection $\phi$ the hatch height h is preferably even again identical to the stored maximum hatch height $h_1$ after the change in the vehicle body level n.

As a result, the above preferred variants for the adaptation of the maximum hatch deflection $\phi$ to a change in the vehicle body level n leads, given a corresponding configuration, to a situation in which the hatch height h when the hatch 2 is at the maximum hatch deflection $\phi$ remains substantially the same even when there is a change in the vehicle body level.

It is interesting that the hatch height h can be defined entirely differently depending on the application. In a particularly preferred refinement, the hatch height h is the height of a reference point 10 at the hatch 2, wherein the reference point 10 is then preferably located in the region of an operator control 9 of the hatch 2. This definition ensures with the above variants that the operator control 9 can always be reached at the set height $h_{1u}$. When the chassis is raised to the vehicle body level $n_2$, the maximum hatch deflection $\phi_1$ is reduced to the maximum hatch deflection $\phi_2$, preferably in such a way that the resulting height $h_{2u}$ corresponds substantially to the set height $h_{1u}$.

However, it is also conceivable that the hatch height h is the height of the highest point of the hatch 2. This definition of the hatch height h was used as the basis for the above statements of the teaching according to the proposal.

The adaptation of the maximum hatch deflection $\phi$ according to the proposal is not performed until a change in the vehicle body level n is complete and the vehicle body level n has been set to a new value. However, in many situations it may also be advantageous that the adaptation, according to the proposal, of the maximum hatch deflection $\phi$ is already performed during the change in the vehicle body level n, in particular in incremental steps. There is preferably provision here that when the hatch 2 is at the maximum hatch deflection $\phi$, in the course of the adjustment of the vehicle body level n, the current maximum hatch deflection $\phi$ is continuously adapted to the current vehicle body level n and that the hatch 2 is always adjusted to the respectively adapted maximum hatch deflection $\phi$.

The advantage of the last-mentioned preferred variant is apparent most clearly from the situation illustrated in FIG. 1. If the user raises the vehicle body level in the situation illustrated in FIG. 1, the hatch would collide with the door 7 of the garage 8 unless the hatch position were adapted. There is no collision with the door 7 of the garage 8 because in the last-mentioned variant the maximum hatch deflection $\phi$ is adapted as it were in real time, and this is also implemented by correspondingly adjusting of the hatch 2.

According to a further teaching, which is also accorded independent significance, the motor-powered hatch arrangement 1 of a motor vehicle as such is claimed. Reference can be made to all the statements which are suitable for explaining the hatch arrangement 1.

What is claimed is:

1. A method for controlling a motor-powered hatch arrangement of a motor vehicle, wherein the hatch arrangement has an upwardly deflectable hatch, a drive arrangement which is assigned to the hatch and a control arrangement which is assigned to the drive arrangement, wherein the motor-powered deflection of the hatch in the opening direction is limited to a maximum hatch deflection by a control arrangement, wherein adjustment of the hatch in the opening direction beyond the maximum hatch deflection is blocked by the control arrangement, wherein the chassis of the motor vehicle can be adjusted vertically as required in order to set different vehicle body levels, and wherein a change in the vehicle body level is automatically compensated for by a change in the maximum hatch deflection by the control arrangement,
   wherein a maximum hatch deflection is set by the control arrangement in a setting process and stored; and
   wherein the maximum hatch deflection is set in a user-defined fashion or is learnt.

2. The method according to claim 1, wherein the upwardly deflectable hatch comprises an upwardly pivotable hatch.

3. The method according to claim 1, wherein the hatch is configured so as to be pivotable about a substantially horizontal hatch axis, and the maximum hatch deflection corresponds to a pivoting angle of the hatch about the hatch axis.

4. The method according to claim 1, wherein in the control arrangement the hatch deflection is represented by a drive variable.

5. The method according to claim 4, wherein in the control arrangement the hatch deflection is represented by a percentage adjustment travel of the drive arrangement.

6. The method according to claim 1, wherein the hatch height is determined from the set maximum hatch deflection by means of the control arrangement using the hatch geometry and is stored as a maximum hatch height.

7. The method according to claim 1, wherein the hatch deflection is determined from the set maximum hatch height by means of the control arrangement using the hatch geometry, and is stored as a maximum hatch deflection.

8. The method according to claim 1, wherein the vehicle body level which is present during the setting process is determined by means of the control device and stored as a reference vehicle body level, or the setting process is always performed with a predetermined reference vehicle body level.

9. The method according to claim 1, wherein the absolute value of the change of the maximum hatch deflection depends linearly on the absolute value of the change in the vehicle body level.

10. The method according to claim 9, wherein the absolute value of the change of the maximum hatch deflection depends linearly on the absolute value of the deviation of the vehicle body level from the reference vehicle body level.

11. The method according to claim 1, wherein the maximum hatch deflection is adapted in such a way that when there is an upward or downward change in the vehicle body level there is a resulting counteracting downward or upward change in the maximum hatch deflection.

12. The method according to claim 1, wherein the maximum hatch deflection is adapted to a change in the vehicle body level, taking into account the hatch geometry, in such a way that at the respective maximum hatch deflection the hatch height before the change does not exceed the hatch height after the change.

13. The method according to claim 12, wherein the two hatch heights are substantially identical.

14. The method according to claim 1, wherein the maximum hatch deflection is adapted to a change in the vehicle body level, taking into account the hatch geometry, in such a way that at the maximum hatch deflection the hatch height does not exceed the stored maximum hatch height after the change in the vehicle body level.

15. The method according to claim 14, wherein at the maximum hatch deflection the hatch height is identical to the stored maximum hatch height after the change in the vehicle body level.

16. The method according to claim 1, wherein the hatch height is the height of a reference point on the hatch or the height of the highest point of the hatch.

17. The method according to claim 1, wherein when the hatch is at the maximum hatch deflection, in the course of the adjustment of the vehicle body level the current maximum hatch deflection is continuously adapted to the current vehicle body level, and the hatch is adjusted to the respectively adapted maximum hatch deflection.

18. A motor-powered hatch arrangement of a motor vehicle, wherein the hatch arrangement has an upwardly deflectable hatch, a drive arrangement which is assigned to the hatch and a control arrangement which is assigned to the drive arrangement, wherein the control arrangement limits the motor-powered deflection of the hatch in the opening direction to a maximum hatch deflection, wherein the chassis of the motor vehicle can be adjusted vertically as required in order to set different vehicle body levels, and the control arrangement changes the maximum hatch deflection to automatically compensate for a change in the vehicle body level,
   wherein the maximum hatch deflection is set by means of the control arrangement in a setting process and stored, and
   wherein the maximum hatch deflection is set in a user-defined fashion or is learnt.

* * * * *